3,755,529
RAPIDLY DISSOLVING ACID COMPOSITION
Basil A. Procyk, Moon Township, Pa., assignor to United States Steel Corporation
No Drawing. Filed Apr. 15, 1971, Ser. No. 134,424
Int. Cl. B01f 3/12, 3/20
U.S. Cl. 252—363.5                                      4 Claims

ABSTRACT OF THE DISCLOSURE

Sodium monooctyl sodium sulfosuccinate and a wetting agent are added to fumaric and other difficultly soluble acids to increase their rate of solubility in water. The wetting agent used is sodium lauryl sulfate, sodium lauryl monoglyceride sulfonate, polyoxyethylene sorbitan stearate, tallow oxyethylated sucrose or coconut oxyethylated sucrose.

BACKGROUND OF THE INVENTION

It is desirable to increase the rate of solubility of fumaric acid to permit practical use in certain applications. For example, fumaric acid is an excellent acidulant for foods. It is low cost, non-hydroscopic, non-toxic and has high acid strength. However, its low rate of solubility excludes its use in certain consumer products such as the dry powder beverage mixes.

Attempts to achieve this desired high rate of solubility have consisted of admixing fumaric acid with more soluble acids such as citric or by coating fumaric acid with wetting agents. These acid mixtures are generally unsatisfactory because substantial amounts of the higher cost acids must still be used and it is doubtful if any real increase in the rate of solubility occurs.

Although the application of wetting agents to fumaric acid has been more successful, these fumaric acid compositions tend to agglomerate either during storage or when added to water. When such agglomeration occurs the fumaric acid does not readily dissolve.

It is therefore an object of this invention to produce an acid composition that will overcome this agglomerative effect and therefore rapidly dissolve in cold water.

SUMMARY OF THE INVENTION

It has been found that the adverse effect of agglomeration on the rate of solubility of fumaric acid or other difficultly soluble acids such as adipic, succinic or pimelic acid can be overcome by the addition of a dispersant and a wetting agent to the acid composition. The dispersant prevents association of the fine fumaric acid particles into agglomerates and thus makes it easier for the surfactant to promote the wetting and solubilization of the fine particles over large agglomerates.

It has been found that sodium monooctyl sodium sulfosuccinate is an excellent dispersant which, in conjunction with a wetting agent will produce a rapidly dissolving fumaric acid composition.

DETAILED DESCRIPTION

The fumaric acid composition comprises fumaric acid, a wetting agent and sodium monooctyl sodium sulfosuccinate. The wetting agent may be any of the commonly used wetting agents such as sodium lauryl sulfate, sodium lauryl mono glyceride sulfonate, polyoxyethylene sorbitan stearate and tallow or coconut oxyethylated sucrose. The wetting agent should be present in an amount ranging from about 0.1 to about 2.0 weight percent of the fumaric acid, preferably from about 0.75 to about 1.0 weight percent. The amount of wetting agent may be increased even above 2.0 weight percent without any negative effects.

Sodium monooctyl sodium sulfosuccinate is effective as a dispersant in fumaric acid compositions when the concentration is at least about 0.1 weight percent of the fumaric acid, preferably from about 0.2 to about 0.3 weight percent. No additional benefits are obtained by adding more than 2.0 weight percent of the sulfosuccinate. Best results are obtained when the wetting agent and the sulfosuccinate dispersant are present in an amount equal to about 0.95 to 1.3 weight percent of the fumaric acid.

To prepare the composition, the fumaric acid, wetting agent and sodium monooctyl sodium sulfosuccinate are blended and ground to an average particle size of less than about 75 microns, preferably less than about 44 microns.

Although my invention has been illustrated using fumaric acid, the principle of my invention may also be used to increase the solubilization rate of other difficultly soluble acids such as adipic, succinic or pimelic acid.

My invention is further illustrated by the following examples, which however are not intended to limit the scope of the invention.

EXAMPLE I 1.0 g. of U.S.P. sodium lauryl sulfate and 1.0 g. of a 30 percent aqueous solution of sodium monooctyl sodium sulfosuccinate were blended with 100 g. of fumaric acid, and ground to a maximum particle size of 44 microns. When 0.15 g. of this mixture was stirred into 100 ml. of ice water, complete solution was achieved in less than one minute. By contrast, two different formulations containing 1.0 g. of sodium lauryl sulfate and 1.0 g. of a 30 percent aqueous solution of sodium monooctyl sodium sulfosuccinate respectively were similarly treated. Using the same test, undissolved fumaric acid agglomerates were still present after one minute in both cases.

EXAMPLE II 0.6 g. of sodium monooctyl sodium sulfosuccinate and 0.5 g. of sodium lauryl sulfate were similarly blended with 100 g. of fumaric acid and ground. Complete solubility was likewise achieved in less than one minute in the above test.

EXAMPLE III 1.0 g. of sodium lauryl monoglyceride sulfonate was blended with 100 g. of fumaric acid. In the solubility test, considerable undissolved acid remained at the end of one minute. When the same formulation was prepared with the addition of 1.0 g. of a 30 percent aqueous solution of sodium monooctyl sodium sulfosuccinate, only a very slight haze of undissolved fumaric acid remained after one minute.

EXAMPLE IV

By the above technique, 0.7 g. of polyoxyethylene sorbitan stearate was required to obtain a satisfactory rapid dissolving formulation. The addition of 0.5 percent of a 30 percent aqueous solution of sodium monooctyl sodium sulfosuccinate permitted a reduction of the amount of polyoxyethylene sorbitan stearate to 0.2 percent with equivalent results.

EXAMPLE V 1.0 g. of tallow oxyethylated sucrose was blended with 100 g. of fumaric acid, ground, and classified to a maximum particle size of 44 microns. This performed well in the aforementioned solubility test. Equivalent results could be obtained with only 0.5 g. of this surfactant when 0.3 g. of a 30 percent aqueous solution of sodium monooctyl sodium sulfosuccinate was added prior to blending. Similar results were obtained when the wetting agent was coconut oxyethylated sucrose.

What is claimed is:

1. In a rapidly dissolving acid composition, wherein the average particle size is less than about 75 microns and which comprises (a) a difficultly soluble acid selected from the group consisting of fumaric, adipic, succinic and pimelic acids, and (b) from about 0.1 to 2.0 percent, based on the weight of said acid, of a wetting agent selected from the group consisting of sodium lauryl sulfate, sodium lauryl monoglyceride sulfonate, polyoxyethylene sorbitan stearate, tallow oxyethylated sucrose and coconut oxyethylated sucrose, the improvement which comprises the combination thereof with (c) from about 0.1 to about 2.0 percent, based on the weight of said acid, of sodium monooctyl sodium sulfosuccinate.

2. The composition of claim 1, wherein the total amount of said wetting agent and said sodium monooctyl sodium sulfosuccinate range from about 0.95 to 1.3 weight percent of said difficultly soluble acid.

3. The composition of claim 2, wherein said sodium monooctyl sodium sulfosuccinate is about 0.2 to about 0.3 weight percent of the acid.

4. The composition of claim 3, wherein said difficultly soluble acid is fumaric acid.

References Cited
UNITED STATES PATENTS

| | | | |
|---|---|---|---|
| 3,351,471 | 11/1967 | Demler et al. | 99—78 |
| 2,176,423 | 10/1939 | Jaeger | 252—354 UX |
| 3,470,213 | 9/1969 | Marquis | 252—363.5 |

RICHARD D. LOVERING, Primary Examiner

U.S. Cl. X.R.

99—78; 252—354, 384